United States Patent
Kimura et al.

(10) Patent No.: US 9,391,537 B2
(45) Date of Patent: Jul. 12, 2016

(54) PHOTOVOLTAIC SYSTEM AND POWER SUPPLY SYSTEM

(71) Applicant: KABUSHIKI KAISHA TOSHIBA, Minato-ku, Tokyo (JP)

(72) Inventors: Misao Kimura, Fuchu (JP); Yasuhiro Noro, Hino (JP); Hideki Hayashi, Kawasaki (JP); Kazuya Omata, Uenohara (JP); Toshiaki Asano, Asaka (JP); Yoshio Ebata, Fuchu (JP); Midori Otsuki, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 566 days.

(21) Appl. No.: 13/939,668

(22) Filed: Jul. 11, 2013

(65) Prior Publication Data
US 2013/0294119 A1    Nov. 7, 2013

Related U.S. Application Data

(63) Continuation of application No. PCT/JP2011/077573, filed on Nov. 29, 2011.

(30) Foreign Application Priority Data

Jan. 20, 2011 (JP) .................. 2011-009857
Feb. 10, 2011 (JP) .................. 2011-027514

(51) Int. Cl.
*H02M 7/42* (2006.01)
*H02J 3/38* (2006.01)

(52) U.S. Cl.
CPC .................. *H02M 7/42* (2013.01); *H02J 3/383* (2013.01); *Y02E 10/563* (2013.01)

(58) Field of Classification Search
CPC ......... H02M 7/42; H02J 3/383; Y02E 10/563
See application file for complete search history.

(56) References Cited

U.S. PATENT DOCUMENTS

| 4,636,931 A | 1/1987 | Takahashi et al. |
| 5,268,832 A | 12/1993 | Kandatsu |

(Continued)

FOREIGN PATENT DOCUMENTS

| CN | 101479928 A | 7/2009 |
| CN | 101841160 A | 9/2010 |

(Continued)

OTHER PUBLICATIONS

Office Action issued in corresponding Arab States of the Gulf application No. GC 2011-17932 dated Dec. 10, 2015 (with English translation).

(Continued)

*Primary Examiner* — Jue Zhang
(74) *Attorney, Agent, or Firm* — Foley & Lardner LLP

(57) ABSTRACT

According to one embodiment, a system includes modules to detect a node voltage and an output current of a converter, a detector to obtain an effective power value, a system condition detector to detect a power supply condition in the electric system or the operating conditions of devices included in the electric system and then output a first signal, a setting unit to switch a set value to a preset first or second value and then output the set value, a unit to calculate an angular frequency of an output voltage of the converter on the basis of an output of the detector, the value, and an output of the system condition detector, and a unit to calculate a target value of the converter.

20 Claims, 14 Drawing Sheets

(56) References Cited

U.S. PATENT DOCUMENTS

| | | | |
|---|---|---|---|
| 7,116,010 | B2 | 10/2006 | Lasseter et al. |
| 7,932,637 | B2 | 4/2011 | Lasseter et al. |
| 2001/0012211 | A1 | 8/2001 | Hasegawa et al. |
| 2004/0051387 | A1* | 3/2004 | Lasseter ............ H02J 3/46 307/80 |
| 2009/0310390 | A1 | 12/2009 | Ohshima et al. |
| 2010/0207456 | A1* | 8/2010 | Lasseter ............ H02J 3/38 307/85 |
| 2010/0256970 | A1 | 10/2010 | Heese et al. |
| 2010/0327657 | A1 | 12/2010 | Kuran |
| 2012/0173031 | A1 | 7/2012 | Parameswaran et al. |
| 2012/0235498 | A1* | 9/2012 | Johnson ............ H02M 7/42 307/82 |
| 2013/0241292 | A1* | 9/2013 | Kimura ............ H02M 7/42 307/66 |

FOREIGN PATENT DOCUMENTS

| | | | |
|---|---|---|---|
| CN | 101902050 | A | 12/2010 |
| DE | 102006047792 | A1 | 4/2008 |
| EP | 1 801 950 | A2 | 6/2007 |
| JP | 63-133835 | A | 6/1988 |
| JP | 07-163054 | A | 6/1995 |
| JP | 2001-211548 | A | 8/2001 |
| JP | 2001-292531 | A | 10/2001 |
| JP | 2002-017044 | A | 1/2002 |
| JP | 2005-094921 | A | 4/2005 |
| JP | 2005-102357 | A | 4/2005 |
| JP | 2005-539476 | A | 12/2005 |
| JP | 2005-146525 | A | 6/2006 |
| JP | 2007-082361 | A | 3/2007 |
| JP | 2007-244068 | A | 9/2007 |
| JP | 2007-318833 | A | 12/2007 |
| JP | 4170565 | B2 | 10/2008 |
| JP | 2009-225599 | A | 10/2009 |
| JP | 2011-8348 | A | 1/2011 |
| TW | 337931 | | 8/2008 |
| WO | WO-2010/000664 | A2 | 1/2010 |
| WO | WO-2010/014073 | A1 | 2/2010 |
| WO | WO 2011/111511 | A1 | 9/2011 |

OTHER PUBLICATIONS

U.S. Appl. No. 13/543,112, filed Jul. 6, 2012, Yoshio et al.
U.S. Appl. No. 13/610,152, filed Sep. 11, 2012, Misao et al.
Chinese Office Action and its English translation dated Nov. 26, 2014, as issued in corresponding Chinese Application No. 201180059814.7.
Driesen J et al: "Virtual synchronous generators", Power and Energy Society General Meeting-Conversation and Delivery of Electrical Energy in the 21st Century, IEEE, Jul. 20, 2008, pp. 1-3.
Extended European Search Report issued in EP 11753137.6 dated Aug. 19, 2015.
Qing-Chang Zhong et al: "Static synchronous generators for distributed generation and renewable enregy", Power Systems Conference and Exposition, IEEE/PES, Mar. 15, 2009, pp. 1-6.
US Notice of Allowance dated Jul. 30, 2015, issued in U.S. Appl. No. 13/610,152.
US Notice of Allowance dated Jul. 14, 2015, issued in U.S. Appl. No. 13/543,112.
Van Thong V et al: "Virtual synchronous generator: Laboratory scale results and field demonstration", POWERTECH, Jun. 28, 2009, IEEE Bucharest, pp. 1-6.
Non-Final Office Action issued in co-pending U.S. Appl. No. 13/610,152 mailed Mar. 6, 2015. (13 pages).
Non-Final Office Action issued in co-pending U.S. Appl. No. 13/543,112 mailed Mar. 20, 2015. (18 pages).

* cited by examiner

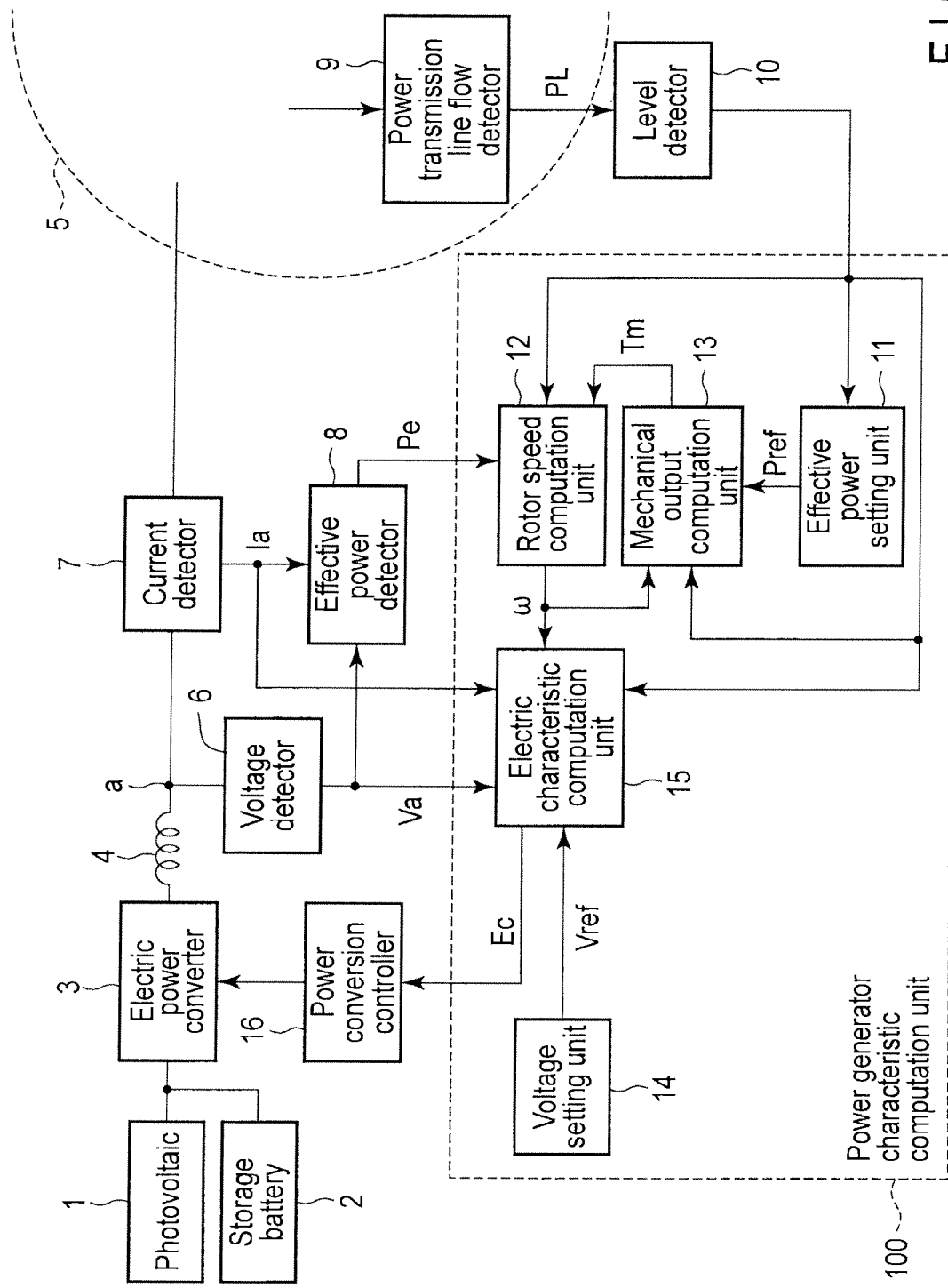
F I G. 1A

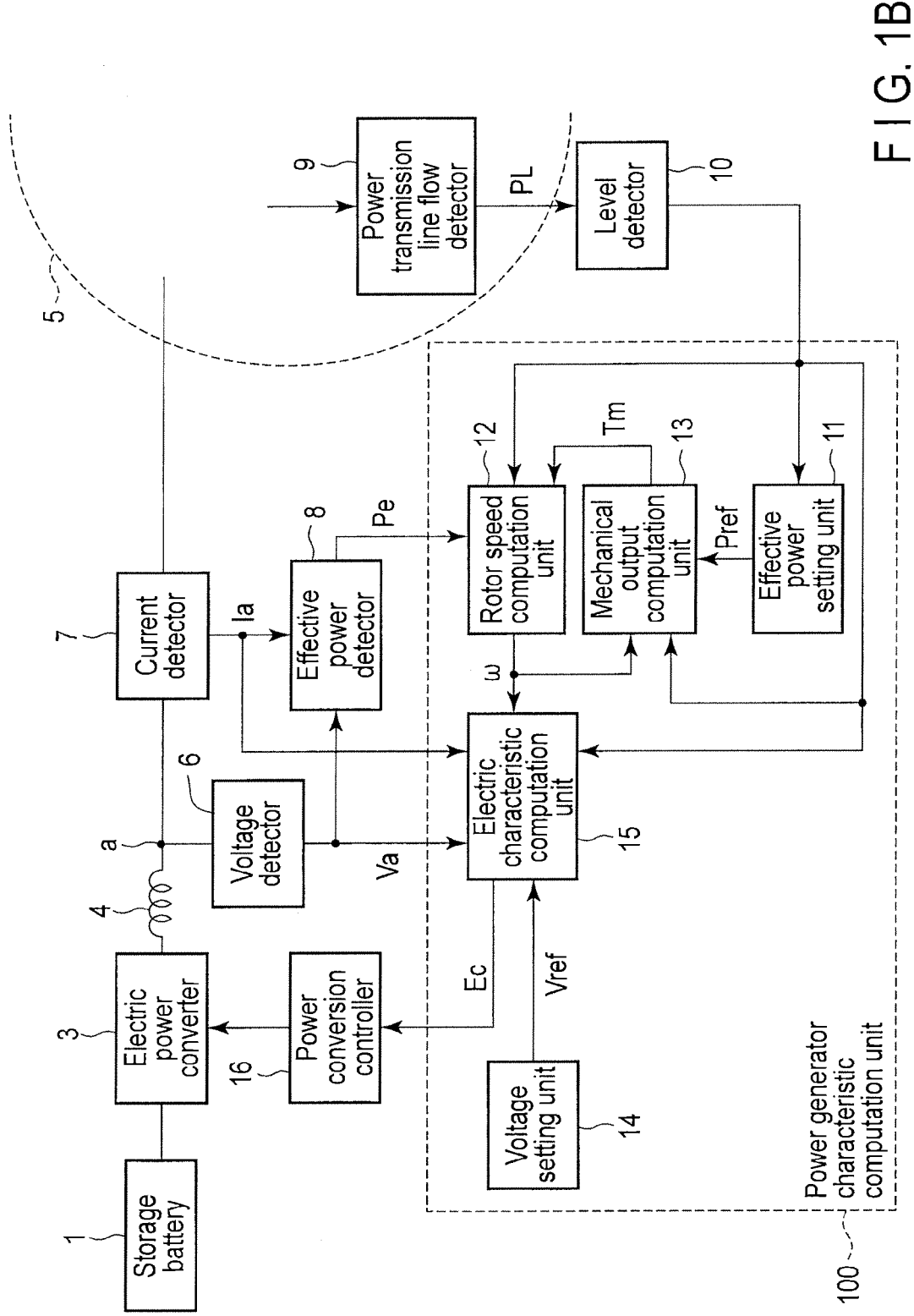
F I G. 1B

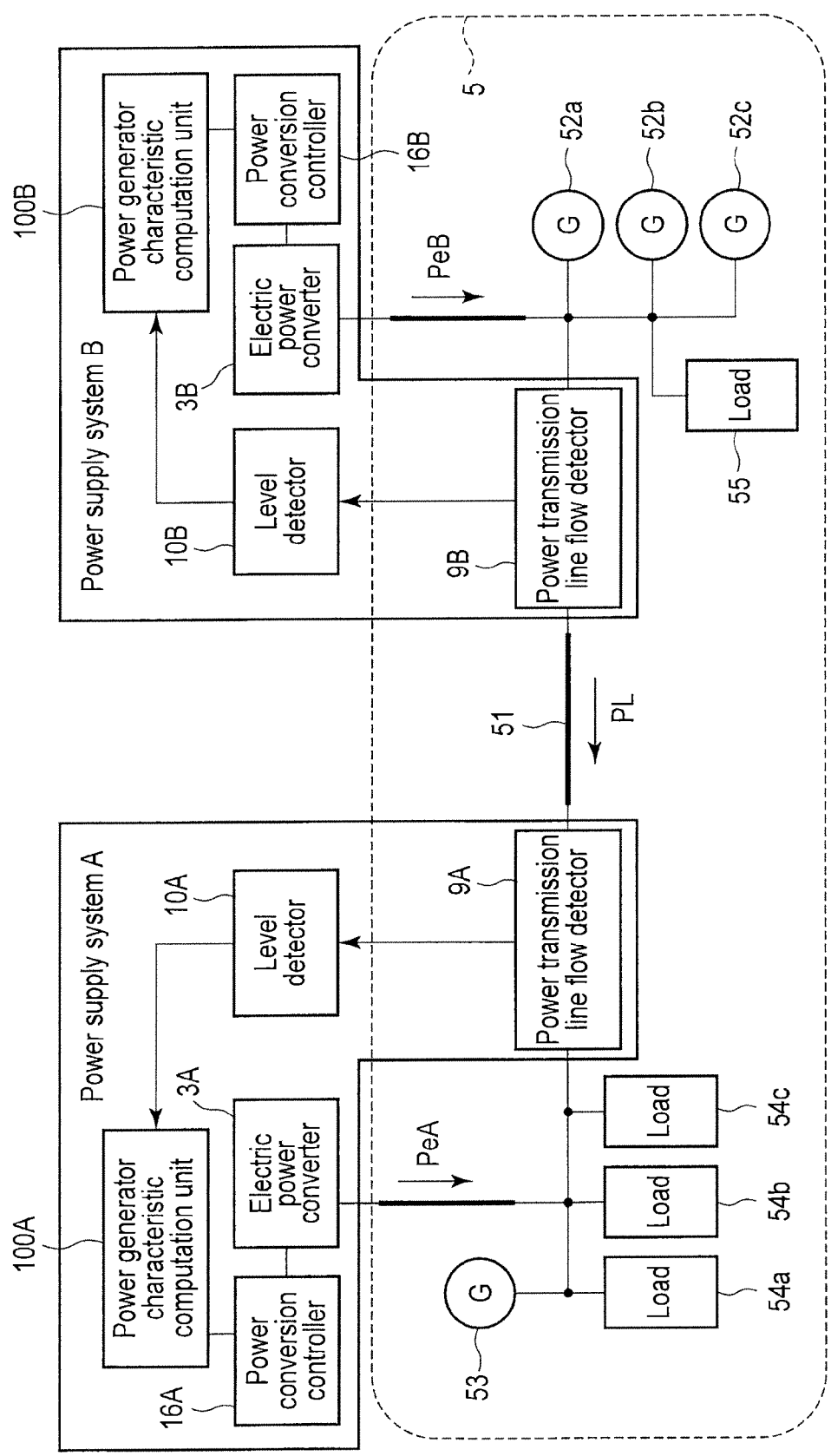
F I G. 2

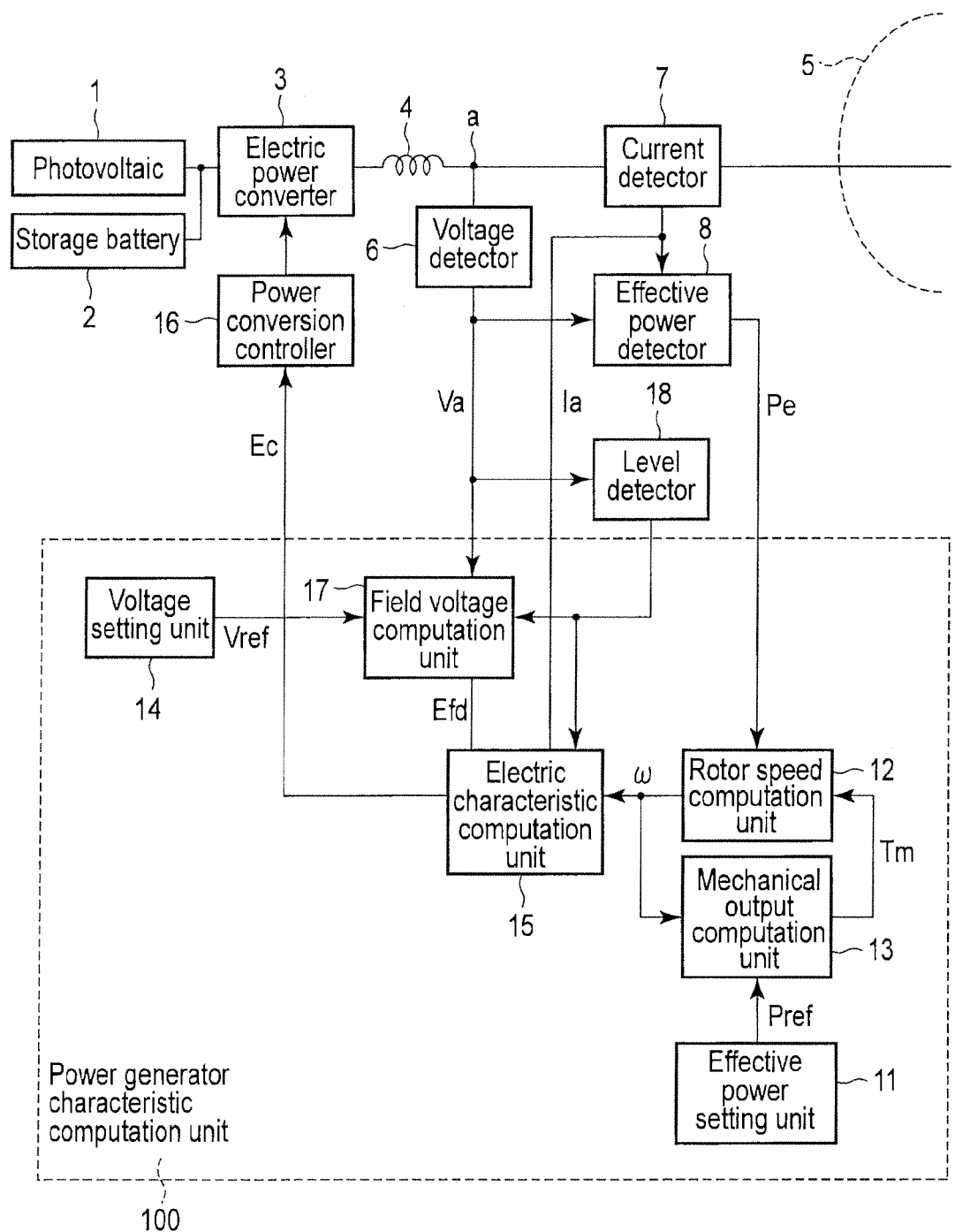
F I G. 5A

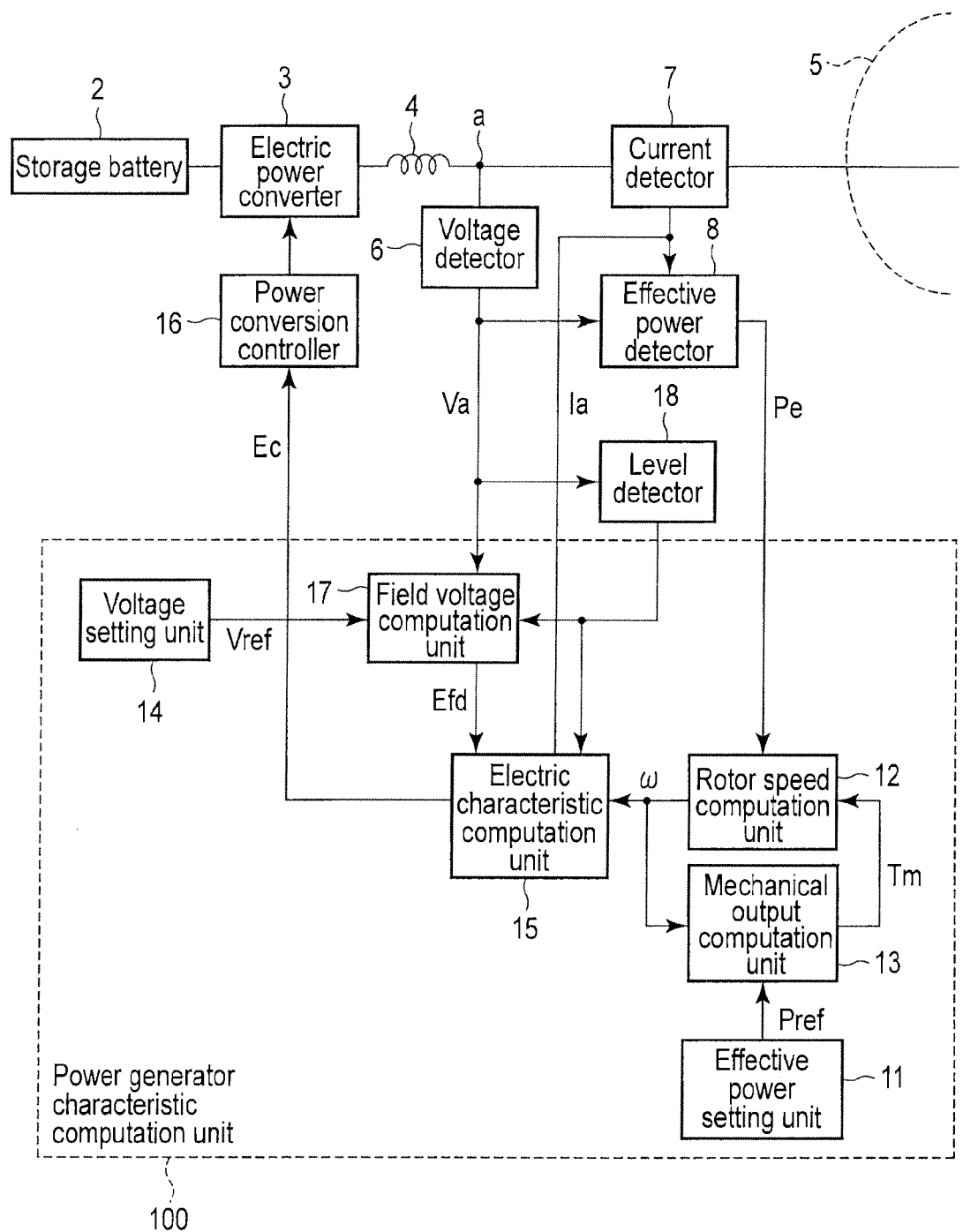
F I G. 5B

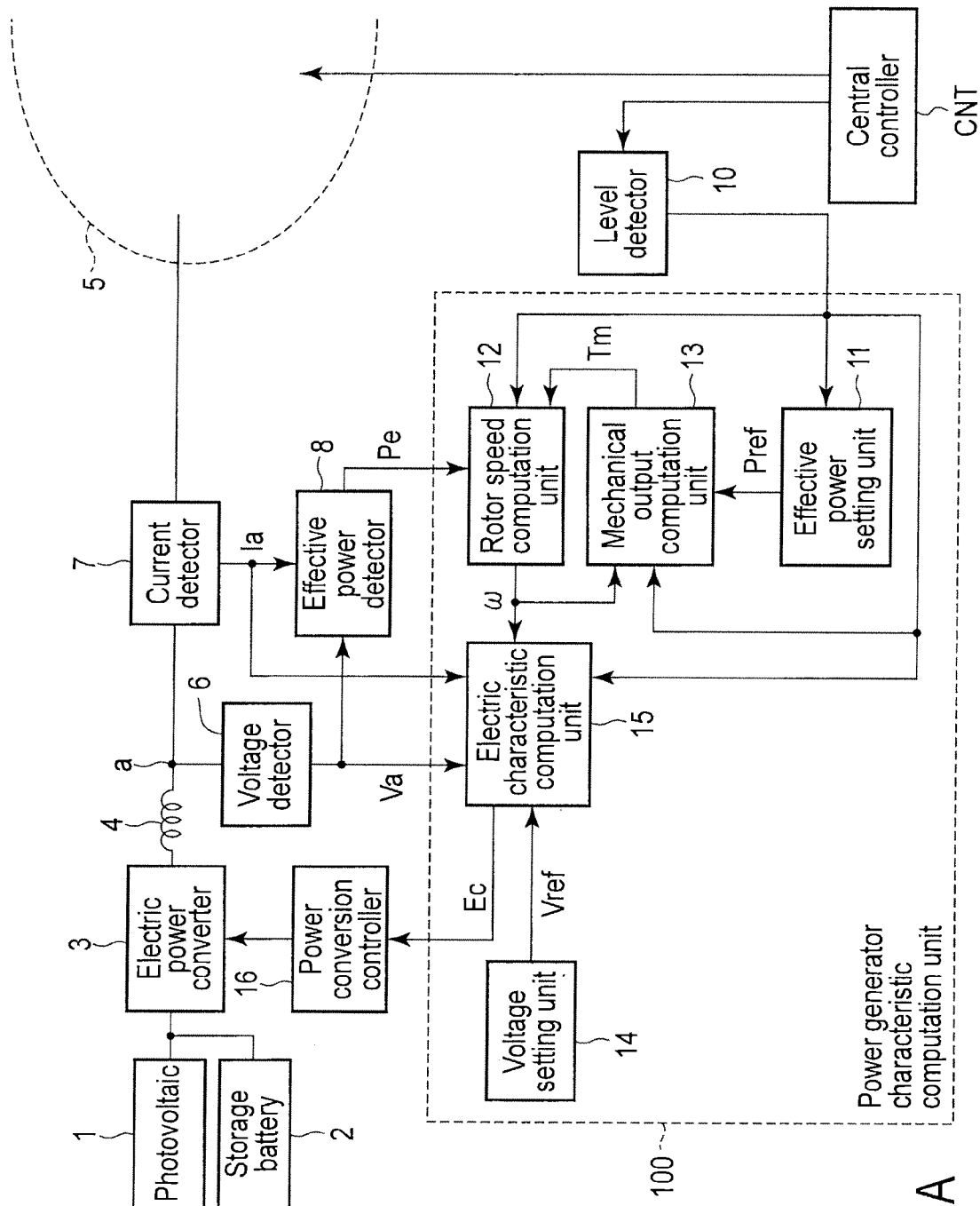
F I G. 8A

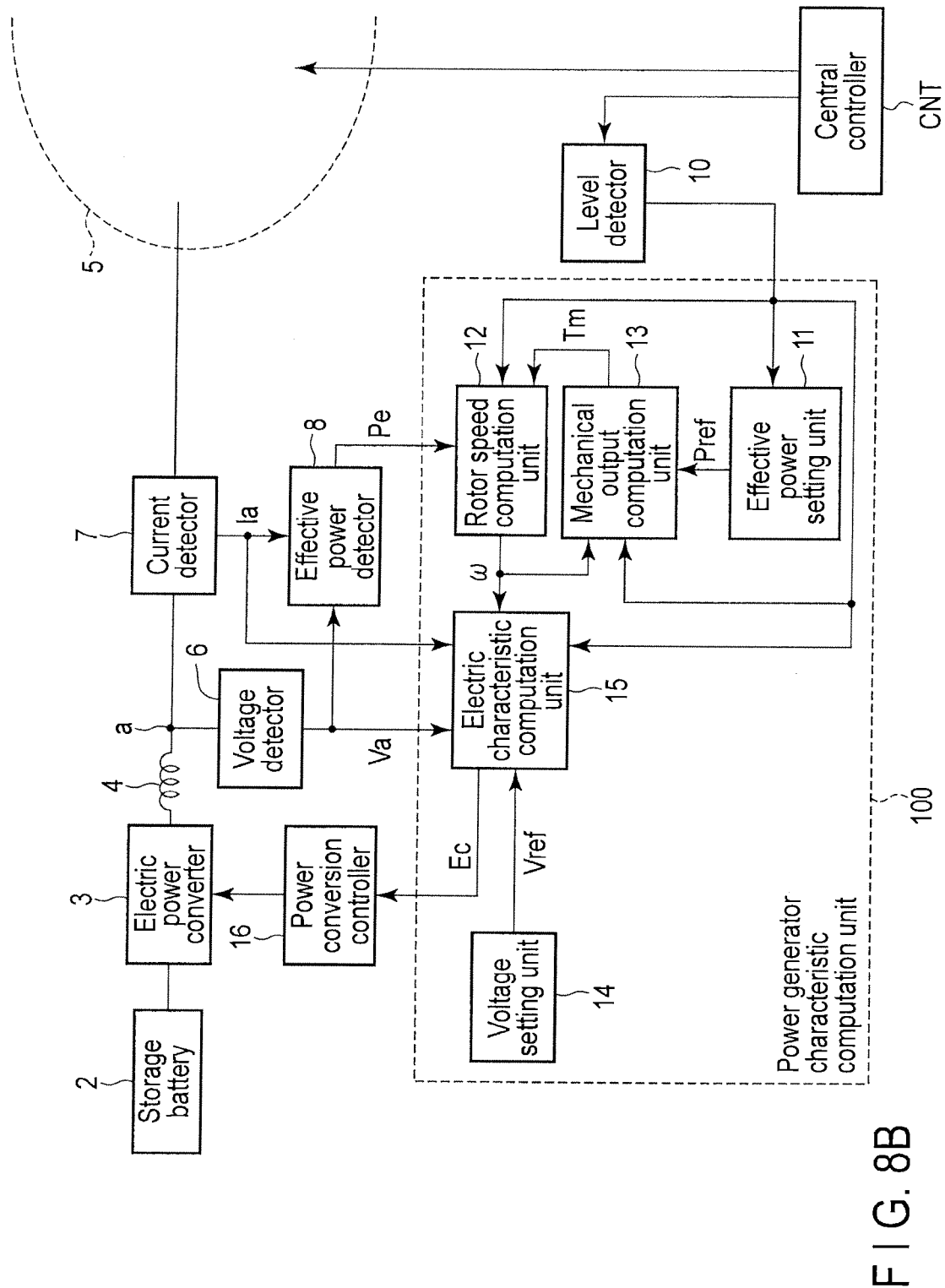
F I G. 8B

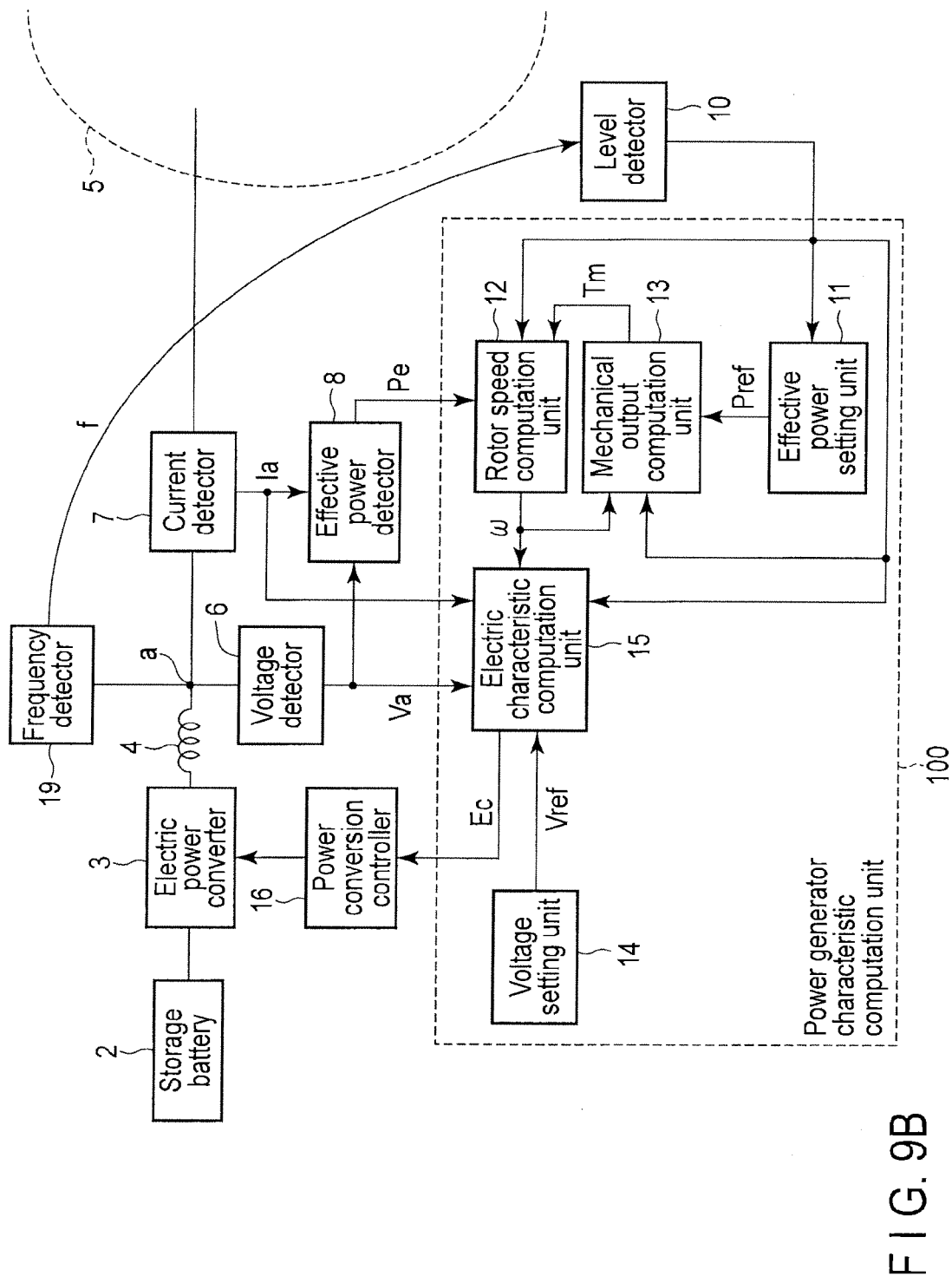
F I G. 9B

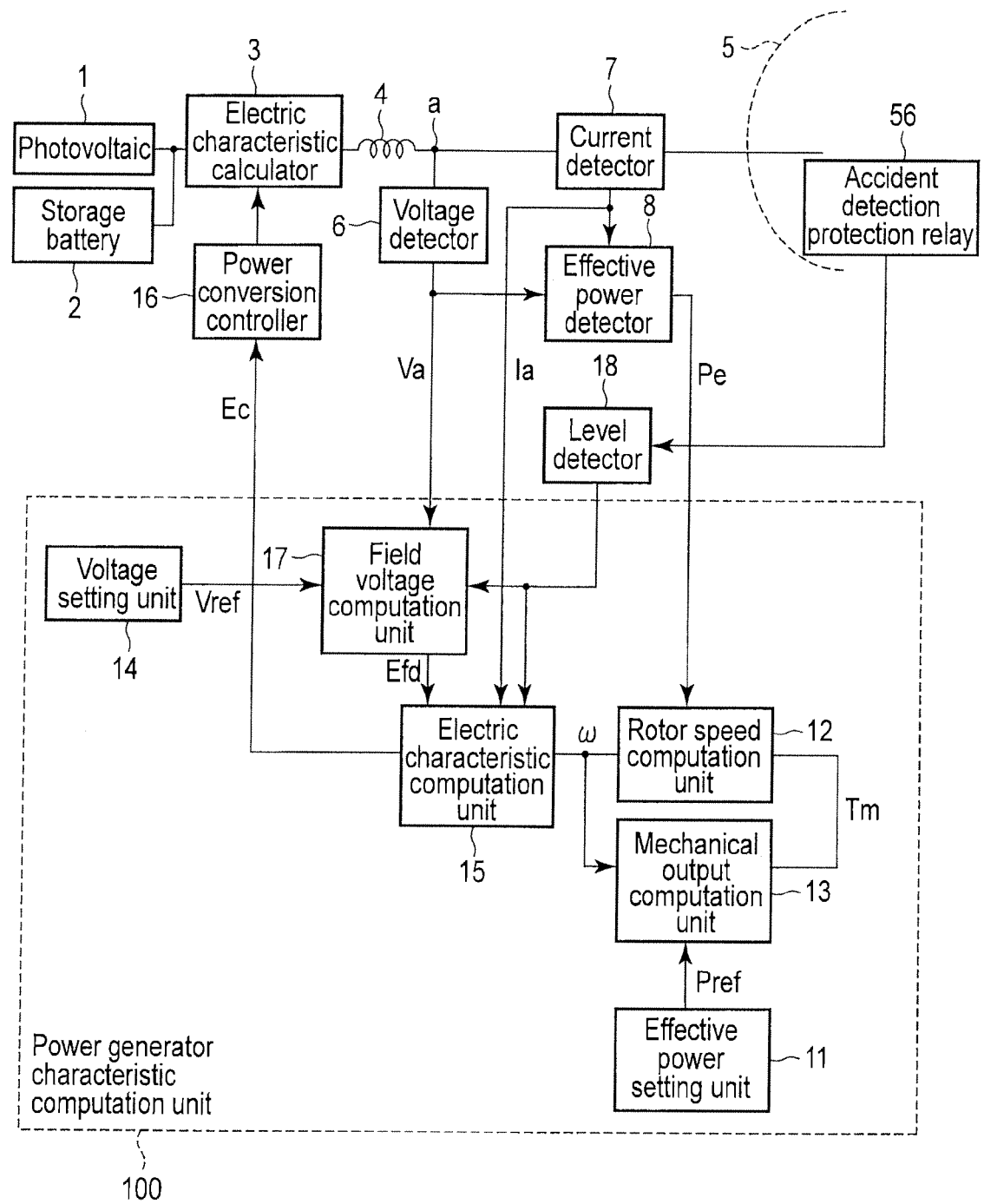
F I G. 10A

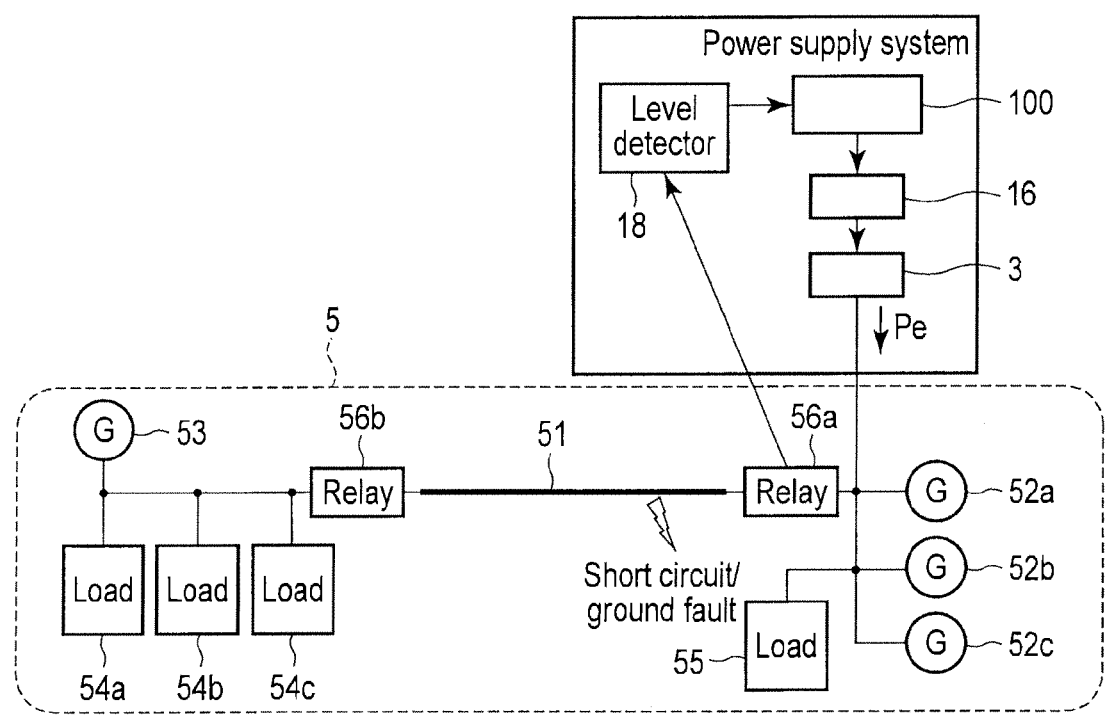
F I G. 11

PHOTOVOLTAIC SYSTEM AND POWER SUPPLY SYSTEM

CROSS REFERENCE TO RELATED APPLICATIONS

This application is a Continuation application of PCT Application No. PCT/JP2011/077573, filed Nov. 29, 2011 and based upon and claiming the benefit of priority from Japanese Patent Applications No. 2011-009857, filed Jan. 20, 2011; and No. 2011-027514, filed Feb. 10, 2011, the entire contents of all of which are incorporated herein by reference.

FIELD

Embodiments described herein relate generally to a photovoltaic system and a power supply system.

BACKGROUND

Recently, there have been studies to install power generation facilities that use renewable energy without greenhouse gas emissions during power generation and achieve lower carbon in electric power supply systems. In power generation using renewable energy, the amount of electric power supply is more difficult to control than in power generation systems such as thermal power generation systems. Thus, stable supply of electric power is demanded.

For example, photovoltaic power generation varies in power generation amount in a long time or in a short time depending on the amount of insolation. It is therefore difficult for the photovoltaic power generation to achieve stable supply of electric power as compared with power generation systems such as thermal power generation systems. In order to solve such a problem, there have been suggestions made regarding conventional photovoltaic systems. One suggestion is to combine a power generation system with a power storage device such as a storage battery so that the total effective power of a photovoltaic power generation module and a power storage is controlled to provide fixed power. Another suggestion is a method of inhibiting a short-time fluctuation in the output of photovoltaic power generation.

However, a synchronous generator for, for example, thermal power generation is potentially provided with a function to inhibit a variation in system frequency, and comprises a governor so that in the even of a variation in system frequency, the amount of power generation is adjusted to inhibit the variation. This contributes to the stabilization of the system frequency. In contrast, the conventional photovoltaic system in which the solar power generation module is combined with the power storage device does not have the above-mentioned frequency adjustment function that is generated in the synchronous generator in the even of a variation in system frequency. It is therefore anticipated that if the photovoltaic systems are introduced in large numbers into an electric power system, the stabilization of the system frequency may be difficult.

On the other hand, each synchronous generator has its own operating characteristics including the function of inhibiting a variation in system frequency. The characteristics cannot be changed even if the conditions of a system to be connected change. Thus, the synchronous generator does not necessarily perform the optimum operation depending on the operating condition of the electric power system.

BRIEF DESCRIPTION OF THE DRAWINGS

FIG. 1A is a diagram showing a configuration example of a photovoltaic system according to a first embodiment;

FIG. 1B is a diagram showing a configuration example of a power supply system according to the first embodiment;

FIG. 2 is a diagram showing a configuration example of an electric power system connected to the photovoltaic system shown in FIG. 1A, a transmission line power flow detector, and a level detector;

FIG. 5A is a diagram showing a configuration example of a photovoltaic System according to a second embodiment;

FIG. 5B is a diagram showing a configuration example of a power supply system according to the second embodiment;

FIG. 8A is a diagram showing a configuration example of a photovoltaic system according to a third embodiment and a fourth embodiment;

FIG. 8B is a diagram showing a configuration example of a power supply system according to the third embodiment and the fourth embodiment;

FIG. 9B is a diagram showing a configuration example of a power supply system according to the fifth embodiment;

FIG. 10A is a diagram showing a configuration example of a photovoltaic system according to a sixth embodiment;

FIG. 11 is a diagram showing a configuration example of an electric power system connected to the photovoltaic system shown in FIG. 10A.

DETAILED DESCRIPTION

Figure 3:
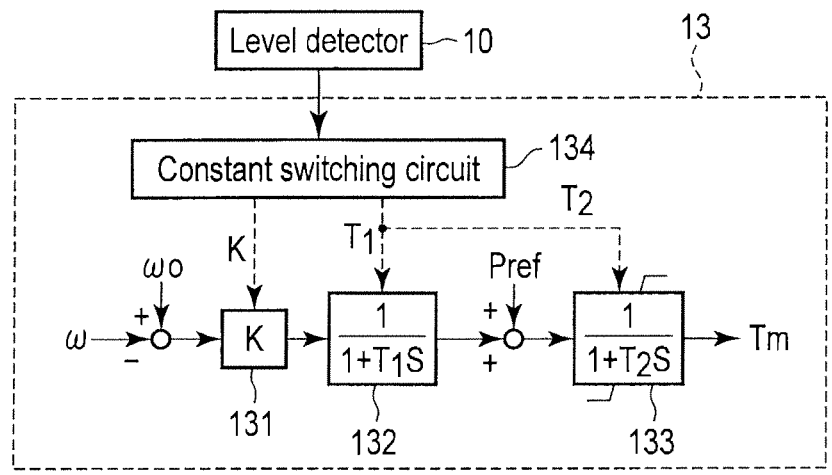
FIG. 3 is a block diagram showing a configuration example of a mechanical output computation unit of the photovoltaic system shown in FIG. 1A.

According to an aspect of the one embodiment, a photovoltaic system comprises an electric power converter configured to convert direct-current power of a direct-current power source including a photovoltaic to alternating-current power and then supply the alternating-current power to an electric power system; a voltage detector configured to detect a node voltage between the electric power system and the electric power converter; a current detector configured to detect an output current of the electric power converter; an effective power detector configured to obtains effective power from outputs of the voltage detector and the current detector; a system condition detector configured to detect a power supply condition in the electric power system or the operating conditions of devices included in the electric power system and then output a level detection signal based on a detection result; an effective power setting unit configured to output an effective power set value a rotor speed computation unit configured to calculate an angular frequency of an output voltage of the electric power converter on the basis of an output of the effective power detector, the effective power set value, and an output of the system condition detector; an electric characteristic computation unit configured to calculate an output voltage target value of the electric power converter on the basis of the angular frequency, a current value detected by the current detector, and a set voltage value; and at least one of module configured to switch the effective power set value to a preset first value or second value on the basis of the level detection signal and constant switching module configured to switch at least one of a constant used for the calculation of the angular frequency and a constant used for the calculation of the output voltage target value on the basis of the level detection signal. The output voltage of the electric power converter is controlled on the basis of the output voltage target value.

According to an aspect of the one embodiment, a power supply system comprises an electric power converter configured to convert direct-current power of a direct-current power source to alternating-current power and then supply the alternating-current power to an electric power system; a voltage detector configured to detect a node voltage between the electric power system and the electric power converter; a current detector configured to detect an output current of the electric power converter; an effective power detector configured to obtain effective power from outputs of the voltage detector and the current detector; a system condition detector configured to detect a power supply condition in the electric power system or the operating conditions of devices included in the electric power system and then output a level detection signal based on a detection result; an effective power setting unit configured to output an effective power set value; a rotor speed computation unit configured to calculate an angular frequency of an output voltage of the electric power converter on the basis of an output of the effective power detector, the effective power set value, and an output of the system condition detector; an electric characteristic computation unit configured to calculate an output voltage target value of the electric power converter on the basis of the angular frequency, a current value detected by the current detector, and a set voltage value; and at least one of module configured to switch the effective power set value to a preset first value or second value on the basis of the level detection signal and constant switching module configured to switch at least one of a constant used for the calculation of the angular frequency and a constant used for the calculation of the output voltage target value on the basis of the level detection signal. The output voltage of the electric power converter is controlled on the basis of the output voltage target value.

Embodiments will be described hereinafter with reference to the drawings.

FIG. 1A shows a configuration example of a photovoltaic system according to a first embodiment. The photovoltaic system according to the present embodiment comprises an electric power converter 3 which converts direct-current power output from a photovoltaic 1 and a storage battery 2 to alternating-current power and outputs the alternating-current power, a voltage detector 6, a current detector 7, an effective power detector 8, a power transmission line flow detector 9, a level detector 10, a power conversion controller 16, and a power generator characteristic computation unit 100.

The electric power converter 3 is connected to an electric power system 5 via a smoothing reactor 4, and outputs the alternating-current power to the electric power system 5. The voltage detector 6 is located at a node a between the smoothing reactor 4 and the electric power system 5, and detects a node voltage Va at the node a. The current detector 7 is connected in series between the electric power system 5 and the electric power converter 3, and detects an output current Ia output from the electric power converter 3. The node voltage Va output from the voltage detector 6 and the output current Ia output from the current detector 7 are input to the effective power detector 8, and the effective power detector 8 outputs effective power Pe to the power generator characteristic computation unit 100.

The power transmission line flow detector 9 detects power, that is, a power transmission line flow PL flowing through a power transmission line 51 (shown in FIG. 2) included in the electric power system 5, and supplies the power transmission line flow PL to the level detector 10. The level detector 10 detects whether the power transmission line flow PL is out of a given range, and outputs a level detection signal corresponding to a detection result to the power generator characteristic computation unit 100.

In the present embodiment, the power transmission line flow detector 9 and the level detector 10 are system condition detectors for detecting a power supply condition in the electric power system 5 or the operating conditions of devices included in the electric power system 5 and then outputting a level detection signal based on a detection result. The power transmission line flow detector 9 may otherwise detect a current flowing through the power transmission line 51 in the electric power system 5. In this case, the level detector 10 detects whether the detected current is out of a given range.

The power generator characteristic computation unit 100 comprises an effective power setting unit 11, a rotor speed computation unit 12, a mechanical output computation unit 13, a voltage setting unit 14, and an electric characteristic computation unit 15.

The effective power setting unit 11 receives the level detection signal output from the level detector 10, and outputs an effective power set value Pref to the mechanical output computation unit 13.

The mechanical output computation unit 13 receives the effective power set value Pref output from the effective power setting unit 11, the level detection signal output from the level detector 10, and an angular frequency $\bar{\omega}$ output from the rotor speed computation unit 12. The mechanical output computation unit 13 outputs mechanical torque Tm to the rotor speed computation unit 12.

The rotor speed computation unit 12 receives the mechanical torque Tm output from the mechanical output computation unit 13, the level detection signal output from the level detector 10, and the effective power Pe detected by the effective power detector 8. The rotor speed computation unit 12 outputs each frequency $\bar{\omega}$ to the mechanical output computation unit 13 and the electric characteristic computation unit 15.

The voltage setting unit 14 outputs a preset voltage set value Vref.

The electric characteristic computation unit 15 receives the level detection signal output from the level detector 10, the node voltage Va detected by the voltage detector 6, the output current La detected by the current detector 7, the angular frequency $\bar{\omega}$ output from the rotor speed computation unit 12, and the voltage set value Vref output from the voltage setting unit 14. The electric characteristic computation unit 15 outputs an output voltage target Ec to the power conversion controller 16.

The output of the power generator characteristic computation unit 100, that is, the output voltage target Ec output from the electric characteristic computation unit 15 is input to the power conversion controller 16, and the power conversion controller 16 controls the electric power converter 3 to achieve the output voltage target Ec.

FIG. 2 shows a configuration example of the electric power system 5 connected to the photovoltaic system shown in FIG. 1A, the power transmission line flow detector 9, and the level detector 10.

The electric power system 5 includes power generators 52a, 52b, 52c, and 53, and loads 54a, 54b, 54c, and 55. Each of these components is connected by the power transmission line 51. The power generators 52a, 52b, and 52c are connected to the power generator 53 via the power transmission line 51. The load 55 is connected to the side of the power transmission line 51 where the power generators 52a, 52b, and 52c are located. The loads 54a, 54b, and 54c are connected to the side of the power transmission line 51 where the power generator 53 is located. In this example, there are a small number of loads around the power generators 52a, 52b, and 52c, while there are a small number of generators on the side of the loads 54a, 54b, and 54c. Therefore, the effective power (power flow) PL normally flows through the power transmission line 51 from the power generators 52a, 52b, and 52c to the loads 54a, 54b, and 54c.

Here, the side where the power generators 52a, 52b, and 52c are opposite to the power transmission line 51 is referred to as a power source side system, and the side where the loads 54a, 54b, and 54c are opposite to the power transmission line 51 is referred to as a load side system. A photovoltaic system A according to the present embodiment is connected to the load side system, and a photovoltaic system B according to the present embodiment is connected to the power source side system. In the following explanation of FIG. 2, "A" is attached to the ends of the reference signs of components of the photovoltaic system A, and "B" is attached to the ends of the reference signs of components of the photovoltaic system B, thereby distinguishing between the components of the respective systems.

The power transmission line flow detectors 9A and 9B are connected in series to the power transmission line 51, and detects effective power, that is, the power flow (power transmission line flow) PL flowing through the power transmission line 51, and supply detection results to the level detectors 10A and 10B.

When the power flow PL in the power transmission line 51 is out of a preset given preset range, the level detectors 10A and 10B provide level detection signals to the power generator characteristic computation units 100A and 100B. If a set level used in the detection in the level detectors 10A and 10B is, for example, 80% of allowable power amount of the power transmission line 51, the level detectors 10A and 10B output predetermined level detection signals to the power generator characteristic computation units 100A and 100B when the power flow PL flowing through the power transmission line 51 is equal to or more than 80% of the allowable power amount.

Now, the basic operation of the electric power converter 3 in the photovoltaic system is described. The electric power converter 3 is what is called an inverter, and outputs an alternating voltage on the basis of a control signal output from the power conversion controller 16. This output voltage is equal to the output voltage target Ec input to the power conversion controller 16. If the output voltage is a leading phase to the voltage of the electric power system 5, effective power flows from the electric power converter 3 to the electric power system 5. A greater phase difference leads to greater effective power. When the output voltage of the electric power converter 3 is higher, the node voltage Va detected by the voltage detector 6, that is, the voltage at the point a where the electric power converter 3 is connected to the electric power system 5 is higher. When the output voltage of the electric power converter 3 is lower, the node voltage Va is lower.

The phase angle and amplitude of the output voltage target Ec which is the output of the power generator characteristic computation unit 100 are independently changed as described above such that the magnitude of the effective power output from the electric power converter 3 and the magnitude of the node voltage Va can be independently controlled.

Now, the operation of the power generator characteristic computation unit 100 which generates the output voltage target Ec is described.

The effective power setting unit 11 outputs the effective power set value Pref to be output from the electric power converter 3. In the present embodiment, the effective power setting unit 11 is configured to switch the effective power set value Pref in accordance with the level detection signal provided from the level detector 10. That is, multiple values are set in the effective power setting unit 11 in advance, and a value selected from the multiple values is output as the effective power set value Pref in accordance with the value of the level detection signal.

In the case shown in FIG. 2, the level detector 10A of the photovoltaic system A and the level detector 10B of the photovoltaic system B provide the predetermined level detection signals to the effective power setting units 11A and 11B of the photovoltaic systems A and B when the flow of the power transmission line 51 is equal to or more than a predetermined value (or equal to or less than a predetermined value).

The signals output from the level detectors 10A and 10B to the effective power setting units 11A and 11B are low-level level detection signals when the flow of the power transmission line 51 is in a given range (e.g., power flow PL<allowable power amount×0.80). The signals output from the level detectors 10A and 10B to the effective power setting units 11A and 11B are high-level level detection signals when the flow of the power transmission line 51 is not in the given range (e.g., power flow PL allowable power amount×0.80).

In this case, when the high-level level detection signal is provided, the effective power setting unit 11A of the photovoltaic system A connected to the load side system switches the effective power set value Pref to a value higher than normal, and the effective power setting unit 11B of the photovoltaic system B connected to the power source side system switches the effective power set value Pref to a value lower than normal.

Thus, at least two values (a first value and a second value) including the normally used value and the value higher than normal are set in advance in the effective power setting unit 11 in the load-side photovoltaic system. At least two values (a first value and a second value) including the normally used value and the value lower than normal are set in advance in the effective power setting unit 11 within the power-source-side photovoltaic system.

Whether the photovoltaic system connected to the electric power system 5 acts as the load side or the power source side may be set in advance in accordance with the configuration of the electric power system 5 to which the photovoltaic system is connected. The setting of the photovoltaic system may be changed after the system is installed. The level detector 10 may detect the direction of the power flow PL of the power transmission line 51 to judge whether the power generator characteristic computation unit 100 acts as the load side or the power source side. In this case, the photovoltaic system can act as the load side or the power source side, so that at least three values including the normally used value, the value higher than normal, and the value lower than normal are set in advance in the effective power setting unit 11.

FIG. 3 shows a block diagram of a configuration example of the mechanical output computation unit 13. The mechanical output computation unit 13 has a function equivalent to a controller of a power generator generally called a governor, and has, by way of example, a configuration shown in the control block diagram in FIG. 3.

The mechanical output computation unit 13 comprises a proportional circuit 131 having an amplification factor K, first-order lag circuits 132 and 133 having time constants T1 and T2, and a constant switching circuit 134. The effective power set value Pref which is the output of the effective power setting unit 11 and the angular frequency $\bar{\omega}$ which is the output of the rotor speed computation unit 12 are input to the mechanical output computation unit 13. The mechanical output computation unit 13 calculates and outputs an equivalent of the mechanical torque Tm in a synchronous generator. The mechanical torque Tm is equivalent to steam energy in a controller of, for example, a thermal power generator.

If the angular frequency $\bar{\omega}$ is lower than a fundamental angular frequency $\bar{\omega}_o$, the inputs of the proportional circuit 131 and the first-order lag circuit 132 are positive values ($\bar{\omega}_o - \bar{\omega} > 0$), and the mechanical torque Tm is increased in the end. If, on the other hand, the angular frequency $\bar{\omega}$ is higher than the fundamental angular frequency $\bar{\omega}_o$, the inputs of the proportional circuit 131 and the first-order lag circuit 132 are negative values ($\bar{\omega}_o - \bar{\omega} < 0$), and the mechanical torque Tm is decreased in the end. The degree and speed of the change of the mechanical torque Tm with the change of the angular frequency $\bar{\omega}$ are determined by the amplification factor K of the proportional circuit 131 and by the time constants T1 and T2 of the first-order lag circuits 132 and 133.

In the photovoltaic system A and the photovoltaic system B according to the present embodiment, the constant switching circuit 134 switches the amplification factor K to a value higher than normal or switches the first-order lag time constants T1 and T2 to values lower than normal when a predetermined level detection signal is provided from the level detector 10, that is, when the power flow of the power transmission line 51 is beyond a given value. When the constant is switched in this way, the mechanical torque Tm more rapidly changes with the change of the angular frequency $\bar{\omega}$. The constant switching circuit 134 has preset multiple values for each constant, and switches these values in accordance with the value of the level detection signal for use as the constant.

Figure 4:
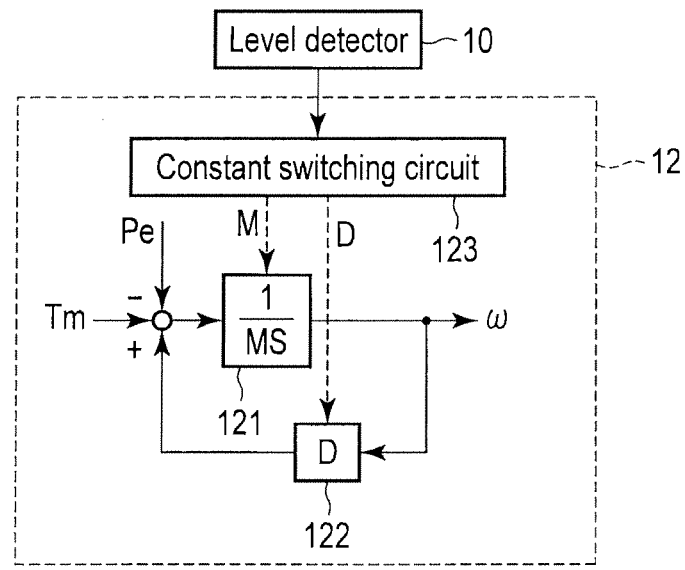
FIG. 4 is a block diagram showing a configuration example of a rotor speed computation unit of the photovoltaic system shown in FIG. 1A.

FIG. 4 shows a block diagram of a configuration example of the rotor speed computation unit 12. The rotor speed computation unit 12 calculates the motion equation of the synchronous generator, and has, by way of example, a configuration shown in the control block diagram in FIG. 4. The rotor speed computation unit 12 comprises an integrator 121, a proportional circuit 122, and a constant switching circuit 123.

In FIG. 4, M of the integrator 121 is an inertia constant of the power generator including its turbine, and D of the proportional circuit 122 is a damping constant. If the mechanical torque Tm is constant and the electric output (effective power) Pe decreases, the input to the integrator 121 is a positive value, so that the angular frequency $\bar{\omega}$ increases at the rate of change corresponding to the inertia constant M and the damping constant D. If, on the other hand, the electric output (effective power) Pe increases, the angular frequency $\bar{\omega}$ decreases. When the electric output (effective power) Pe is constant and the mechanical torque Tm changes, the polarity is reversed. The degree and speed of the change of the angular frequency $\bar{\omega}$ with the changes of the mechanical torque Tm and the electric output (effective power) Pe are determined by the inertia constant M and the damping constant D.

In the photovoltaic system A and the photovoltaic system B according to the present embodiment, the constant switching circuit 123 switches the inertia constant M or the damping constant D to a value lower than normal when a predetermined level detection signal is provided from the level detector 10, that is, when the power flow of the power transmission line 51 is beyond a given value. The constant switching circuit 123 has preset multiple values for each constant, and switches these values in accordance with the value of the level detection signal for use as the constant. This switching allows the angular frequency $\bar{\omega}$ to more rapidly change with the changes of the mechanical torque Tm and the electric output (effective power) Pe.

The mechanical output computation unit 13 decreases the mechanical torque Tm when the angular frequency $\bar{\omega}$ increases, or increases the mechanical torque Tm when the angular frequency $\bar{\omega}$ decreases. In the meantime, the rotor speed computation unit 12 decreases the angular frequency $\bar{\omega}$ when the mechanical torque Tm decreases, or increases the angular frequency $\bar{\omega}$ when the mechanical torque Tm increases. Therefore, the mechanical output computation unit 13 and the rotor speed computation unit 12 act to inhibit the variation of the angular frequency $\bar{\omega}$, that is, the variation of the frequency.

The electric characteristic computation unit 15 calculates the electric characteristic equation of the synchronous generator known as Park's equation. In this calculation, the electric characteristic computation unit 15 uses constants that show electric transient response characteristics of the electric power, such as synchronous reactance Xd, transient reactance Xd', sub-transient reactance Xd", transient time constant Td', and sub-transient time constant Td".

The level detection signal output from the level detector 10, the voltage set value Vref which is the output of the voltage setting unit 14, the angular frequency $\bar{\omega}$ which is the output of the rotor speed computation unit 12, the output current Ia of the electric power converter 3 obtained by the current detector 7, and the node voltage Va obtained by the voltage detector 6 are input to the electric characteristic computation unit 15. The electric characteristic computation unit 15 thereby calculates a value equivalent to a power generator terminal voltage, and provides this value to the power conversion controller 16 as the output voltage target Ec.

In the photovoltaic system A and the photovoltaic system B according to the present embodiment shown in FIG. 2, the electric characteristic computation unit 15 switches the transient time constant Td' and the sub-transient time constant Td" to values lower than normal when a predetermined level detection signal is provided from the level detector 10, that is, when the power flow of the power transmission line 51 is beyond a given value. This switching allows the output voltage target Ec to more rapidly change with the changes of the angular frequency $\bar{\omega}$, the voltage Va, and the current Ia. The electric characteristic computation unit 15 has preset multiple values for each constant, and switches these values in accordance with the value of the level detection signal for use as the constant.

In consequence, the photovoltaic system according to the present embodiment runs with characteristics equivalent to those of the synchronous generator. When the power flow of the power transmission line is beyond a given value, the output of the photovoltaic system connected to the load side is increased, and the output of the photovoltaic system connected to the power source side is decreased, thereby reducing the power transmission line flow. Moreover, the constant that simulates the characteristics of the power generator is switched. As a result, the actual output change speed associated with the change of the effective power set value Pref is higher than normal, and the time for the reduction of the power transmission line flow is reduced.

As described above, according to the present embodiment, the power conversion controller 16 controls the output voltage of the electric power converter 3 on the basis of the motion equation of the synchronous generator, the electric characteristic equation (Park's equation), and the output of the power generator characteristic computation unit 100 for calculating the characteristics of the governor which is a controller of the synchronous generator. Thus, the electric power converter 3 operates in the same manner as the synchronous generator in accordance with the changes in the voltage and frequency of the electric power system 5.

Furthermore, the photovoltaic system according to the present embodiment can operate in the same manner as the synchronous generator, for example, to output effective power as scheduled, and can therefore be handled in the same manner as the synchronous generator. When the power transmission line flow in the electric power system 5 is beyond a given value, the output of the electric power converter 3 rapidly changes to reduce the power flow. This permits the elimination of a heavy power flow, the stability of the system, and the prevention of excessive load on the power transmission line.

As shown in FIG. 1B, a power supply system without the photovoltaic 1 is also possible. The storage battery 2 is charged with electric power from the electric power system 5.

That is, according to the present embodiment, it is possible to provide a photovoltaic system and a power supply system which stably supply electric power in accordance with the operating condition of an electric power system.

Now, a photovoltaic system according to a second embodiment is described with reference to the drawings. In the following explanation of the second embodiment, the same components as those in the photovoltaic system according to the first embodiment are given the same reference marks and are not repeatedly described.

FIG. 5A shows a configuration example of the photovoltaic system according to the second embodiment. The photovoltaic system according to the second embodiment is different from that according to the first embodiment in that a power generator characteristic computation unit 100 further comprises a field voltage computation unit 17 and a level detector 18. A node voltage Va output from a voltage detector 6 is input to the level detector 18. The output of the level detector 18 is provided to the field voltage computation unit 17 and an electric characteristic computation unit 15. The level detector 18 is a system condition detector for detecting a phase fault or a ground fault of a power transmission line in an electric power system 5 and then outputting a level detection signal based on a detection result.

Figure 6:
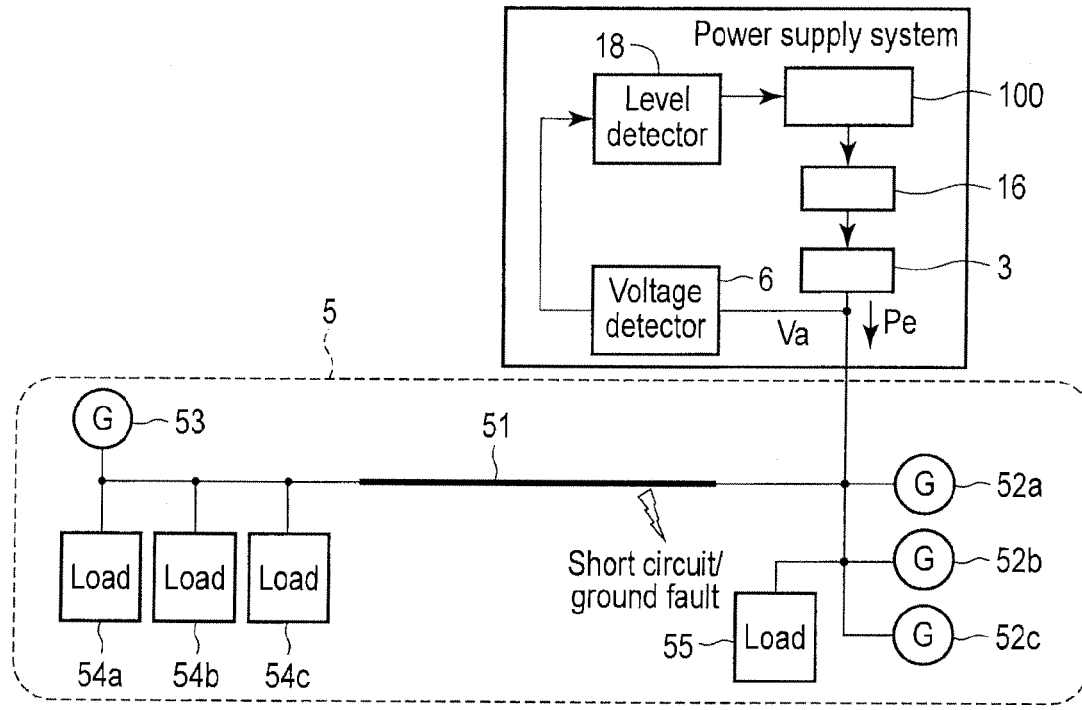
FIG. 6 is a diagram showing a configuration example of an electric power system connected to the photovoltaic system shown in FIG. 5A.

FIG. 6 shows a configuration example of the electric power system 5 connected to the photovoltaic system according to the second embodiment shown in FIG. 5A, the voltage detector 6, and the level detector 18. The photovoltaic system according to the present embodiment is connected to a power source side system. When the magnitude of the node voltage Va between the photovoltaic system and the electric power system 5 is equal to or less than a given value, the level detector 18 provides a predetermined level detection signal to the power generator characteristic computation unit 100. Used as a set level of the level detector 18 is the value of a voltage estimating a fault such as a phase fault or a ground fault that may occur in the vicinity of the photovoltaic system. For example, a value equal to or less than 50% of a rated voltage is used.

For example, the level detector 18 outputs a high-level level detection signal when the magnitude of the node voltage Va is equal to or less than 50% of the rated voltage. The level detector 18 outputs a low-level level detection signal when the magnitude of the node voltage Va is higher than 50% of the rated voltage.

Figure 7:
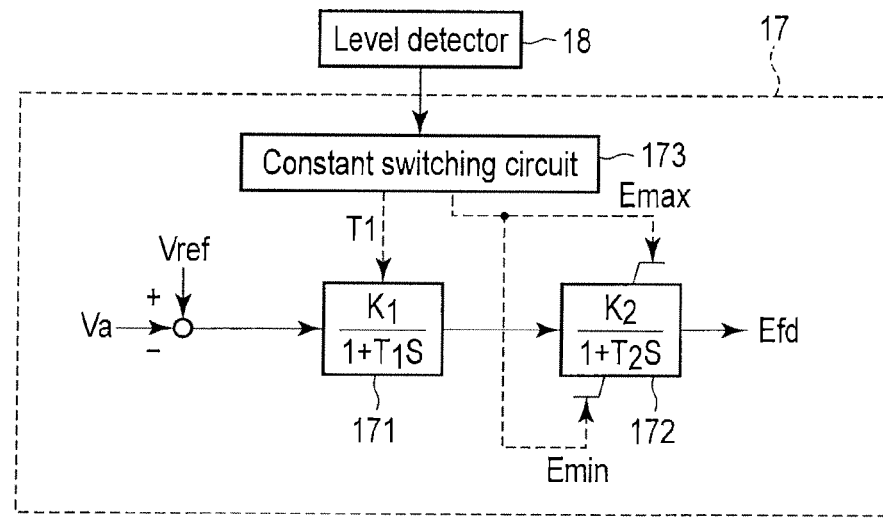
FIG. 7 is a block diagram showing a configuration example of a field voltage computation unit of the photovoltaic system shown in FIG. 5A.

FIG. 7 shows a configuration example of the field voltage computation unit 17. The field voltage computation unit 17 is equivalent to what is generally called an excitation system. The field voltage computation unit 17 comprises two first-order lag circuits 171 and 172, and a constant switching circuit 173.

The field voltage computation unit 17 outputs an equivalent of a field voltage Efd in accordance with a difference (Vref−Va) between a voltage set value Vref and the node voltage Va obtained by the voltage detector 6. If the node voltage Va is lower than the voltage set value Vref, the input to the first-order lag circuit 171 is a positive value, so that the field voltage Efd increases. If, on the other hand, the node voltage Va is higher than the voltage set value Vref, the field voltage Efd decreases.

The amplitude of an output voltage target Ec obtained by the electric characteristic computation unit 15 changes in the same direction as the field voltage Efd which is the output of the field voltage computation unit 17. Therefore, if the voltage of the electric power system 5 decreases, the field voltage Efd increases, and the output voltage target Ec also increases, which functions to inhibit the voltage sag of the electric power system 5. If, on the other hand, the voltage of the electric power system 5 increases, the output voltage target Ec also decreases, which functions to inhibit the voltage rise of the electric power system 5.

The degree and speed of the change of the field voltage Efd with the change of the node voltage Va are determined by first-order lag time constants T1 and T2, first-order lag gains K1 and K2, and output limit values Emax and Emin. In the photovoltaic system according to the present embodiment, the constant switching circuit 173 switches, for example, the first-order lag time constant T1 to a value lower than normal, and sets the output limit value Emax to be higher than normal and sets the output limit value Emin to be lower than normal to switch to a wider output range, when a level detection signal is provided from the level detector 18, that is, when the node voltage Va has greatly decreased.

This switching of the constant allows the field voltage Efd to more rapidly and greatly change with the change of the node voltage Va. The constant switching circuit 173 may be configured to also switch the first-order lag time constant T2, and the values of the first-order lag gains K1 and K2. For example, when the node voltage Va has greatly decreased, the constant switching circuit 173 may set the first-order lag time constants T1 and T2 to values lower than normal, set the gains K1 and K2 to values higher than normal, and switch the output limit values Emax and Emin to provide a range wider than normal. The switching of these constants allows the field voltage Efd to more rapidly and greatly change with the change of the node voltage Va. The constant switching circuit 173 has preset multiple values for each constant, and switches these values in accordance with the value of the level detection signal for use as the constant.

Furthermore, when a predetermined level detection signal is provided from the level detector 18, that is, when the node voltage Va has greatly decreased, the electric characteristic computation unit 15 switches a transient time constant Td' and a sub-transient time constant Td" to values lower than normal. This switching allows the output voltage target Ec to more rapidly change with the changes of an angular frequency $\bar{\omega}$, the field voltage Efd, and a current Ia.

In consequence, the photovoltaic system according to the present embodiment runs with characteristics equivalent to those of the synchronous generator. In the event of a fault such as a phase fault or a ground fault occurring in the vicinity of the photovoltaic system and resulting in a significant voltage drop, the function of the excitation system is increased, and the speed of response of the electric characteristic computation unit to the changes of the field voltage Efd and the angular frequency $\bar{\omega}$ is increased. This permits the maintenance of a system voltage. As a result, the transient stability of power generators 52a, 52b, and 52c of the electric power system 5 is improved.

As described above, according to the present embodiment, the power conversion controller 16 controls the output voltage of a electric power converter 3 on the basis of the motion equation of the synchronous generator, the electric characteristic equation (Park's equation), and the output of the power generator characteristic computation unit 100 for calculating the characteristics of the governor which is a controller of the synchronous generator and the characteristics of the excitation system. Thus, the electric power converter 3 operates in the same manner as the synchronous generator in accordance with the changes in the voltage and frequency of the electric power system 5. Furthermore, the photovoltaic system can operate in the same manner as the synchronous generator, for example, to output effective power as scheduled, and can therefore be handled in the same manner as the synchronous generator. Moreover, in the event of a fault such as a phase fault or a ground fault occurring in the electric power system 5, the output voltage of a electric power converter 3 rapidly changes to enhance a voltage maintaining function. As a result, the transient stability of the neighboring power generators is improved, and an instability phenomenon such as a power swing or a step out can be prevented.

As shown in FIG. 5B, a power supply system without a photovoltaic 1 is also possible. A storage battery 2 is charged with electric power from the electric power system 5.

That is, according to the present embodiment, it is possible to provide a photovoltaic system and a power supply system which stably supply electric power in accordance with the operating condition of an electric power system.

Although the level detection signal output from the level detector 18 is supplied to the electric characteristic computation unit 15 and the field voltage computation unit 17 according to the second embodiment described above, the level detection signal may also be supplied to an effective power setting unit 11, a rotor speed computation unit 12, and a mechanical output computation unit 13. In this case, the effective power setting unit 11 switches an effective power set value Pref in accordance with the value of the level detection signal, the rotor speed computation unit 12 switches the constant used for calculation in accordance with the value of the level detection signal, and the mechanical output computation unit 13 switches the constant used for calculation in accordance with the value of the level detection signal. Consequently, advantageous effects similar to those according to the first embodiment can be provided.

Now, a photovoltaic system according to a third embodiment is described with reference to the drawings.

FIG. 8A shows a configuration example of the photovoltaic system according to the third embodiment. In the photovoltaic system according to the first embodiment, the detection value of the power transmission line flow PL is used as the signal input to the level detector 10. In the third embodiment, however, a load frequency control (LFC) output of a central controller CNT for monitoring and controlling the whole electric power system 5, and LFC surplus power (surplus power of an output signal of the LFC) are used instead of the detection value of the power transmission line flow PL.

The LFC instructs each power generator included in the electric power system 5 to increase or decrease its output to inhibit a variation in the frequency of the system. For example, the LFC surplus power is reduced when a smaller number of power generators run at night.

That is, if the LEO surplus power is equal to or less than a given value, the surplus of electric power that can be generated by the power generators included in the electric power system 5 is reduced, and the supply of electric power by the power generators included in the electric power system 5 is more likely to be unstable. Therefore, according to the present embodiment, when the LFC surplus power is equal to or less than a given value, an output voltage target Ec to be achieved by the photovoltaic system is raised, and the power supply by the photovoltaic system is increased, thereby stabilizing the electric power system 5.

In the present embodiment, when detecting that the LFC surplus power is equal to or less than a given value, the level detector 10 outputs a predetermined level detection signal. The level detector 10 is a system condition detector for detecting a power supply condition in the electric power system 5 or the operating conditions of devices included in the electric power system 5 and then outputting a level detection signal based on a detection result.

As in the photovoltaic system according to the first embodiment, when the LFC surplus power is equal to or less than a given value, an effective power set value Pref, the constant used for calculation in a rotor speed computation unit 12, the constant used for calculation in a mechanical output computation unit 13, and the constant used for calculation in an electric characteristic computation unit 15 are switched. As a result, the electric power output by the photovoltaic system can be more rapidly and greatly changed. Thus, the amount of LFC adjustment is increase, and the system frequency can be stabilized.

As shown in FIG. 8B, a power supply system without a photovoltaic 1 is also possible. A storage battery 2 is charged with electric power from the electric power system 5.

That is, according to the present embodiment, it is possible to provide a photovoltaic system and a power supply system which stably supply electric power in accordance with the operating condition of an electric power system.

Now, a photovoltaic system according to a fourth embodiment is described with reference to the drawings.

In the photovoltaic system according to the first embodiment, the detection value of the power transmission line flow PL is used as the signal input to the level detector 10. In the fourth embodiment, however, the capacity of a power generator which has been brought to an operating condition different from a preset schedule (e.g., the operating condition of a power generator connected to an electric power system 5), or system splitting information (e.g., the operating conditions of a power transmission line and a transformer included in the electric power system 5) are used instead of the detection value of the power transmission line flow PL.

The photovoltaic system according to the present embodiment is configured, for example, as shown in FIG. 8A. The capacity of the power generator and the system splitting information are output to the level detector 10 from a central controller CNT. The level detector 10 is a system condition detector for detecting a power supply condition in the electric power system 5 or the operating conditions of devices included in the electric power system 5 and then outputting a level detection signal based on a detection result.

That is, if the capacity of electric power to be generated by the power generator which performs an operation different from the preset schedule is equal to or more than a given value, stable power supply in the electric power system 5 is difficult. In the event of system splitting caused by a trouble such as a broken power supply path in the electric power system 5, stable power supply in the electric power system 5 is difficult. Thus, in the photovoltaic system according to the present embodiment, the capacity of a power generator which has been brought to an operating condition different from a schedule in the level detector 10 is detected, or system splitting information is detected. Thus, effective power Pe output from the photovoltaic system is controlled for stable power supply.

In the present embodiment, the level detector 10 detects that the capacity of a power generator which has been brought to an operating condition different from a set schedule, for example, due to an emergency stop is off a given value, or detects that system splitting has occurred. The level detector 10 then outputs a predetermined level of a level detection signal.

As in the photovoltaic system according to the first embodiment, when the capacity of a power generator which has been brought to an operating condition different from a set schedule is off a given value or when system splitting has occurred, an effective power set value Pref, the constant used for calculation in a rotor speed computation unit 12, the constant used for calculation in a mechanical output computation unit 13, and the constant used for calculation in an electric characteristic computation unit 15 are switched. As a result, the electric power output by the photovoltaic system can be more rapidly changed. Thus, an insufficient or excessive amount of power generation is prevented, and the system frequency can be stabilized.

As shown in FIG. 8B, a power supply system without a photovoltaic 1 is also possible. A storage battery 2 is charged with electric power from the electric power system 5.

That is, according to the present embodiment, it is possible to provide a photovoltaic system and a power supply system which stably supply electric power in accordance with the operating condition of an electric power system.

Now, a photovoltaic system according to a fifth embodiment is described with reference to the drawings.

Figure 9A:
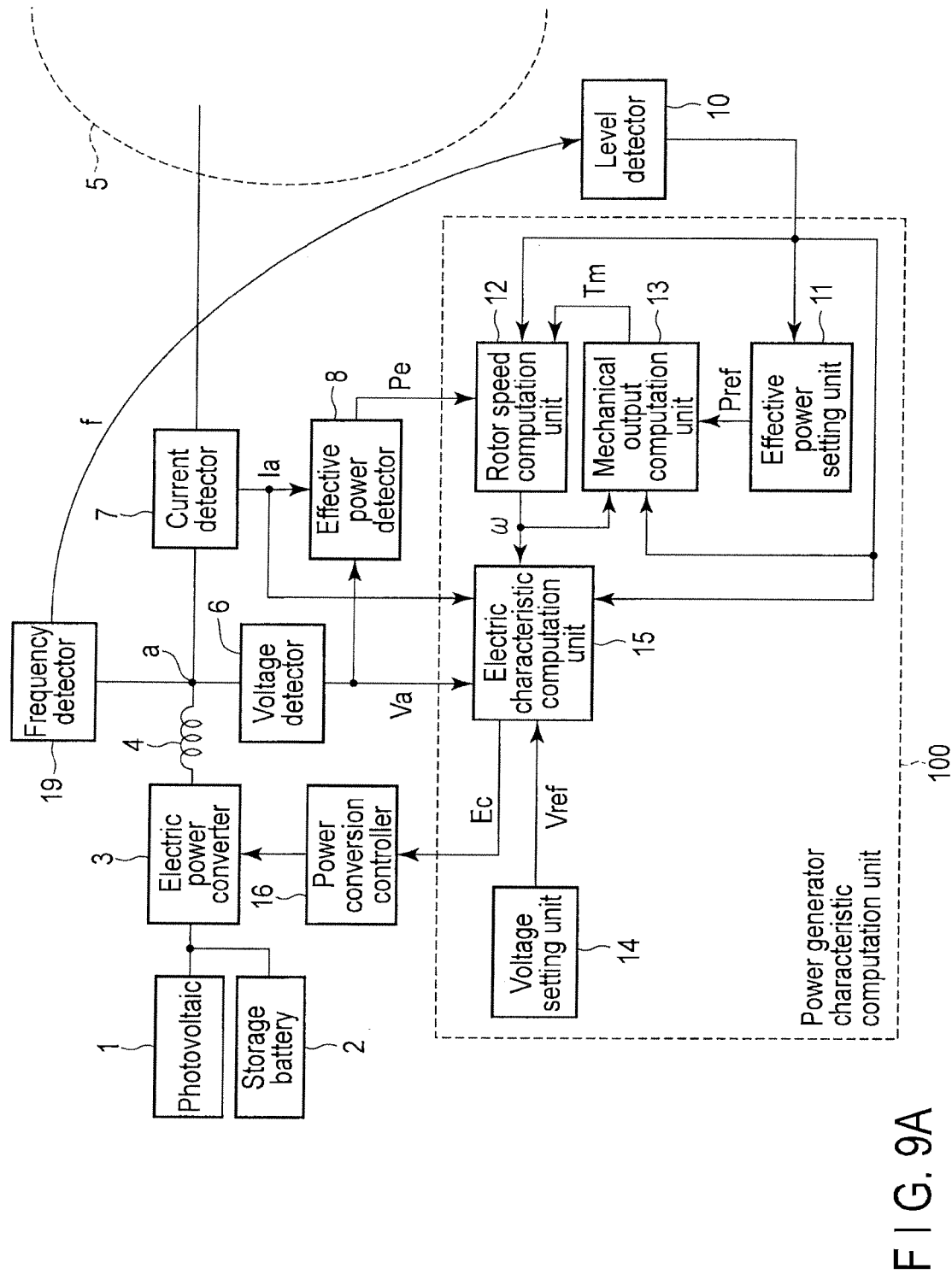
FIG. 9A is a diagram showing a configuration example of a photovoltaic system according to a fifth embodiment.

FIG. 9A shows a configuration example of the photovoltaic system according to the fifth embodiment. In the photovoltaic system according to the first embodiment, the detection value of the power transmission line flow PL is used as the signal input to the level detector 10. In the fifth embodiment, however, a frequency detection value of a node voltage Va is used instead of the detection value of the power transmission line flow PL.

The photovoltaic system according to the present embodiment comprises a frequency detector 19. The frequency detector 19 detects the frequency of the node voltage Va, and outputs the detected value to the level detector 10. The frequency detector 19 and the level detector 10 are system condition detectors for detecting a power supply condition in the electric power system 5 or the operating conditions of devices included in the electric power system 5 and then outputting a level detection signal based on a detection result.

In the present embodiment, the level detector 10 detects that the frequency of the node voltage Va is out of a given range, and outputs a predetermined level of a level detection signal. As in the photovoltaic system according to the first embodiment, when the frequency of the node voltage Va is out of a given range, an effective power set value Pref, the constant used for calculation in a rotor speed computation unit 12, the constant used for calculation in a mechanical output computation unit 13, and the constant used for calculation in an electric characteristic computation unit 15 are switched. As a result, the electric power output by the photovoltaic system according to the present embodiment can be more rapidly changed, and the system frequency can be stabilized.

As shown in FIG. 9B, a power supply system without a photovoltaic 1 is also possible. A storage battery 2 is charged with electric power from the electric power system 5.

That is, according to the present embodiment, it is possible to provide a photovoltaic system and a power supply system which stably supply electric power in accordance with the operating condition of an electric power system as in the photovoltaic system and the power supply system according to the first embodiment.

Now, a photovoltaic system according to a sixth embodiment is described with reference to the drawings. In the following explanation of the sixth embodiment, the same components as those in the photovoltaic system according to the second embodiment are given the same reference marks and are not repeatedly described.

The photovoltaic system according to the second embodiment uses the node voltage Va as the signal input to the level detector 18, and detects that the value of the node voltage Va has dropped to a given value or less and thereby detects a fault such as a phase fault or a ground fault. In the sixth embodiment, however, the output of a fault detection protective relay 56 disposed in an electric power system 5 is used instead of the node voltage Va.

FIG. 10A shows a configuration example of the photovoltaic system according to the sixth embodiment.

FIG. 11 shows a configuration example of an electric power system connected to a power supply system according to the present embodiment. When the fault detection protective relay 56 comes into operation, a predetermined signal informing that the fault detection protective relay 56 has come into operation is output to the level detector 18 from the fault detection protective relay 56. The level detector 18 detects that the predetermined signal has been output from the fault detection protective relay 56, and outputs a predetermined level of a level detection signal. The level detector 18 is a system condition detector for detecting a phase fault or a ground fault of a power transmission line in an electric power system 5 and then outputting a level detection signal based on a detection result.

As in the photovoltaic system according to the second embodiment, when the fault detection protective relay 56 comes into operation, the constant used for calculation in a field voltage computation unit 17 and the constant used for calculation in an electric characteristic computation unit 15 are switched. Thus, the output voltage of a electric power converter 3 rapidly changes to enhance the voltage maintaining function of the photovoltaic system according to the present embodiment. As a result, the transient stability of the neighboring power generators is improved, and an instability phenomenon such as a power swing or a step out can be prevented.

Figure 10B:
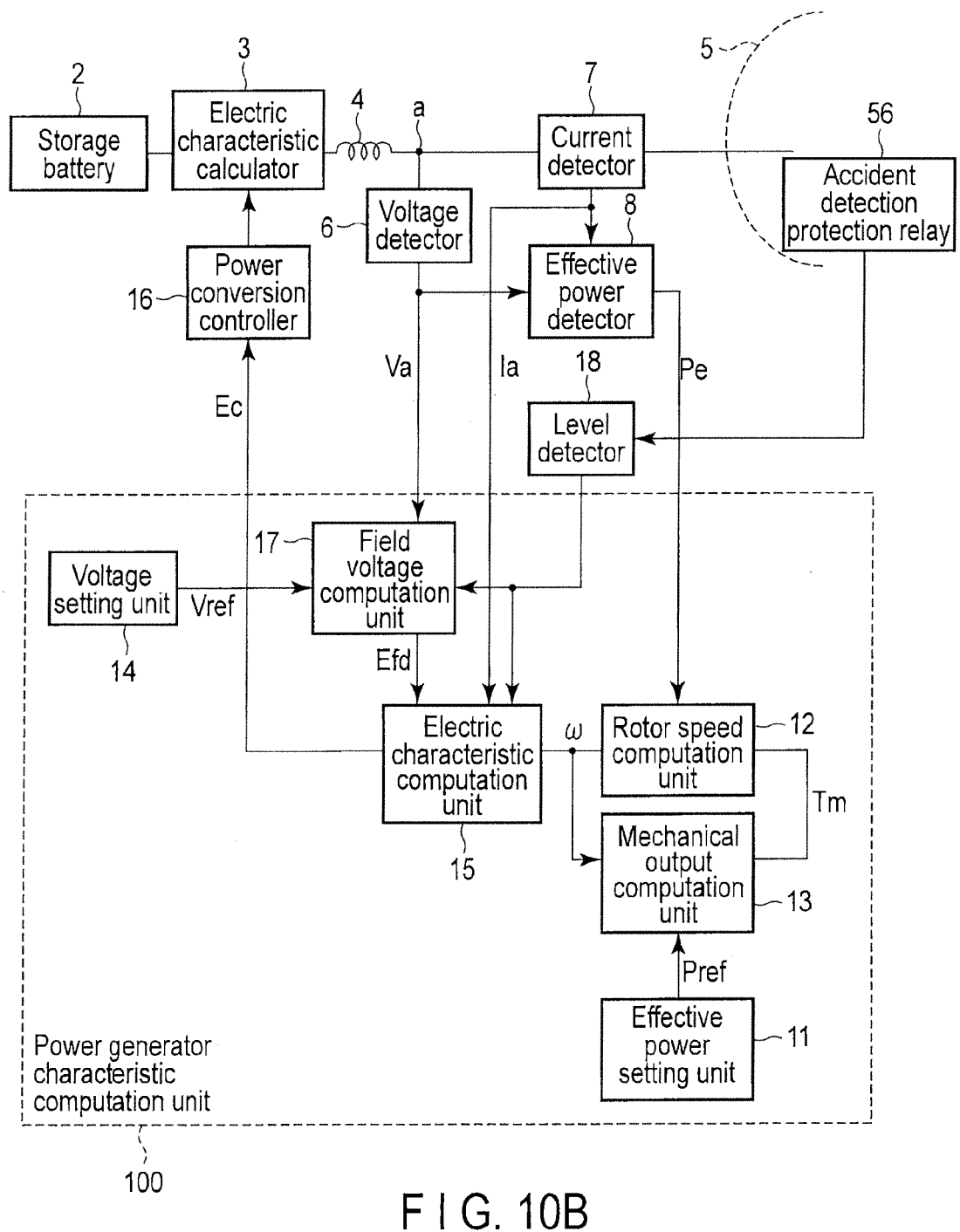
FIG. 10B is a diagram showing a configuration example of a power supply system according to the sixth embodiment.

As shown in FIG. 10B, a power supply system without a photovoltaic 1 is also possible. A storage battery 2 is charged with electric power from the electric power system 5.

That is, according to the present embodiment, it is possible to provide a photovoltaic system and a power supply system which stably supply electric power in accordance with the operating condition of an electric power system as in the photovoltaic system according to the second embodiment.

In the photovoltaic systems according to the first to sixth embodiments, the conditions for changing the operating characteristics of the photovoltaic system and examples of combinations of constants to be switched to change the characteristics have been shown. However, if given conditions and combinations of constants are selected in accordance with the characteristics of the electric power system to which the photovoltaic system is connected, the operating stability of each electric power system can be more improved.

While several embodiments of the present invention have been described, these embodiments have been presented by way of example only, and are not intended to limit the scope of the inventions. These novel embodiments can be carried out in a variety of other forms, and various omissions, substitutions, and changes may be made without departing from the spirit of the invention. The accompanying claims and their equivalents are intended to cover such embodiments and modifications as would fall within the scope and spirit of the inventions. For example, when the voltage obtained by the voltage detector 6 is not automatically controlled at a specified value, that is, when a voltage variation attributed to the increase or decrease of the effective power is permitted, the field voltage computation unit 17 can be omitted if the field voltage equivalent value Efd is set in the voltage setting unit 14. When the characteristics of a single synchronous generator are only needed and the inhibition of the variation of the angular frequency $\bar{\omega}$ is not needed, the mechanical output computation unit 13 can be omitted if the mechanical output Tm is set in the effective power setting unit 11.

What is claimed is:

1. A photovoltaic system comprising:
an electric power converter configured to convert direct-current power of a direct-current power source including a photovoltaic to alternating-current power and then supply the alternating-current power to an electric power system;
a voltage detector configured to detect a node voltage between the electric power system and the electric power converter;
a current detector configured to detect an output current of the electric power converter;
an effective power detector configured to obtains effective power from outputs of the voltage detector and the current detector;
a system condition detector configured to detect a power supply condition in the electric power system or the operating conditions of devices included in the electric power system and then output a level detection signal based on a detection result;
an effective power setting unit configured to output an effective power set value;
a rotor speed computation unit configured to calculate an angular frequency of an output voltage of the electric power converter on the basis of an output of the effective power detector, the effective power set value, and an output of the system condition detector;
an electric characteristic computation unit configured to calculate an output voltage target value of the electric power converter on the basis of the angular frequency, a current value detected by the current detector, and a set voltage value; and
at least one of module configured to switch the effective power set value to a preset first value or second value on the basis of the level detection signal and constant switching module configured to switch at least one of a constant used for the calculation of the angular frequency and a constant used for the calculation of the output voltage target value on the basis of the level detection signal,
wherein the output voltage of the electric power converter is controlled on the basis of the output voltage target value.

2. The photovoltaic system according to claim 1, wherein the system condition detector comprises a power transmission line flow detector configured to detect a current or a power flow flowing through a power transmission line in the electric power system, and a level detector configured to detect whether the current or the power flow through the power transmission line in the electric power system is out of a given range and then output a level detection signal based on a detection result.

3. The photovoltaic system according to claim 1, wherein the system condition detector detects at least whether LFC output signal surplus power provided from a central controller of the electric power system is out of a given range or whether system splitting has occurred by the operating conditions of a power transmission line and a transformer included in the electric power system.

4. The photovoltaic system according to claim 1, wherein the system condition detector comprises a frequency detector configured to detect the frequency of a voltage detected by the voltage detector, and a level detector configured to detect whether the frequency detected by the frequency detector is out of a given range and then output a predetermined level detection signal when the frequency is out of the given range.

5. The photovoltaic system according to claim 1, further comprising a mechanical output computation unit configured to figure out a mechanical output equivalent value of the simulative synchronous generator on the basis of an output of the effective power setting unit, an output of the rotor speed computation unit, and an output of the system condition detector, wherein the rotor speed computation unit is configured to calculate the angular frequency of the output voltage of the electric power converter on the basis of the mechanical output equivalent value, an effective power value detected by the effective power detector, and an output of the system condition detector.

6. The photovoltaic system according to claim 5, wherein the mechanical output computation unit comprises a constant switching circuit configured to switch a constant used for calculation on the basis of the output of the system condition detector.

7. The photovoltaic system according to claim 1, wherein the rotor speed computation unit comprises a constant switching circuit configured to switch a constant used for calculation on the basis of the output of the system condition detector.

8. The photovoltaic system according to claim 1, wherein the electric characteristic computation unit comprises a constant switching circuit configured to switch a constant used for calculation on the basis of the output of the system condition detector.

9. A photovoltaic system comprising:
an electric power converter configured to convert direct-current power of a direct-current power source including a photovoltaic to alternating-current power and then supply the alternating-current power to an electric power system;
a voltage detector configured to detect a node voltage between the electric power system and the electric power converter;
a current detector configured to detect an output current of the electric power converter;
an effective power detector configured to obtain effective power from outputs of the voltage detector and the current detector;
a system condition detector configured to detect a phase fault or a ground fault of a power transmission line in the electric power system and then output a level detection signal based on a detection result;

an effective power setting unit configured to output a preset effective power set value;

a rotor speed computation unit configured to calculate an angular frequency of an output voltage of the electric power converter on the basis of an output of the effective power detector, an output of the effective power setting unit, and an output of the system condition detector;

a field voltage computation unit configured to calculate a field voltage equivalent value of a simulative synchronous generator on the basis of a voltage detected by the voltage detector, the set voltage, and an output signal of the system condition detector and then output the field voltage equivalent value; and an electric characteristic computation unit configured to calculate an output voltage target value of the electric power converter on the basis of the angular frequency, a current value detected by the current detector, the level detection signal output from the system condition detector, and the field voltage equivalent value, wherein the field voltage computation unit configured to comprise a switching circuit configured to switch a constant used for calculation on the basis of the level detection signal, and the output voltage of the electric power converter is controlled on the basis of the output voltage target value.

10. The photovoltaic system according to claim 5, wherein the system condition detector detects whether an output of the voltage detector is equal to or less than a predetermined value or whether a protective relay which detects a power transmission line system fault in the electric power system is activated.

11. A power supply system comprising:

an electric power converter configured to convert direct-current power of a direct-current power source to alternating-current power and then supply the alternating-current power to an electric power system;

a voltage detector configured to detect a node voltage between the electric power system and the electric power converter;

a current detector configured to detect an output current of the electric power converter;

an effective power detector configured to obtain effective power from outputs of the voltage detector and the current detector;

a system condition detector configured to detect a power supply condition in the electric power system or the operating conditions of devices included in the electric power system and then output a level detection signal based on a detection result;

an effective power setting unit configured to output an effective power set value;

a rotor speed computation unit configured to calculate an angular frequency of an output voltage of the electric power converter on the basis of an output of the effective power detector, the effective power set value, and an output of the system condition detector;

an electric characteristic computation unit configured to calculate an output voltage target value of the electric power converter on the basis of the angular frequency, a current value detected by the current detector, and a set voltage value; and at least one of module configured to switch the effective power set value to a preset first value or second value on the basis of the level detection signal and constant switching module configured to switch at least one of a constant used for the calculation of the angular frequency and a constant used for the calculation of the output voltage target value on the basis of the level detection signal, wherein the output voltage of the electric power converter is controlled on the basis of the output voltage target value.

12. The power supply system according to claim 11, wherein the system condition detector comprises a power transmission line flow detector configured to detect a current or a power flow flowing through a power transmission line in the electric power system, and a level detector configured to detect whether the current or the power flow through the power transmission line in the electric power system is out of a given range and then output a level detection signal based on a detection result.

13. The power supply system according to claim 11, wherein the system condition detector detects at least whether LFC output signal surplus power provided from a central controller of the electric power system is out of a given range or whether system splitting has occurred by the operating conditions of a power transmission line and a transformer included in the electric power system.

14. The power supply system according to claim 11, wherein the system condition detector comprises a frequency detector configured to detect the frequency of a voltage detected by the voltage detector, and a level detector configured to detect whether the frequency detected by the frequency detector is out of a given range and then output a predetermined level detection signal when the frequency is out of the given range.

15. The power supply system according to claim 11, further comprising a mechanical output computation unit configured to figure out a mechanical output equivalent value of the simulative synchronous generator on the basis of an output of the effective power setting unit, an output of the rotor speed computation unit, and an output of the system condition detector, wherein the rotor speed computation unit is configured to calculate the angular frequency of the output voltage of the electric power converter on the basis of the mechanical output equivalent value, an effective power value detected by the effective power detector, and an output of the system condition detector.

16. The power supply system according to claim 15, wherein the mechanical output computation unit comprises a constant switching circuit configured to switch a constant used for calculation on the basis of the output of the system condition detector.

17. The power supply system according to claim 11, wherein the rotor speed computation unit comprises a constant switching circuit configured to switch a constant used for calculation on the basis of the output of the system condition detector.

18. The power supply system according to claim 11, wherein the electric characteristic computation unit comprises a constant switching circuit configured to switch a constant used for calculation on the basis of the output of the system condition detector.

19. A power supply system comprising:

a electric power converter configured to convert direct-current power of a direct-current power source to alternating-current power and then supply the alternating-current power to an electric power system;

a voltage detector configured to detect a node voltage between the electric power system and the electric power converter;

a current detector configured to detect an output current of the electric power converter;

an effective power detector configured to obtain effective power from outputs of the voltage detector and the current detector;

a system condition detector configured to detect a phase fault or a ground fault of a power transmission line in the electric power system and then output a level detection signal based on a detection result;

an effective power setting unit configured to output a preset effective power set value;

a rotor speed computation unit configured to calculate an angular frequency of an output voltage of the electric power converter on the basis of an output of the effective power detector, an output of the effective power setting unit, and an output of the system condition detector;

a field voltage computation unit configured to calculate a field voltage equivalent value of a simulative synchronous generator on the basis of a voltage detected by the voltage detector, the set voltage, and an output signal of the system condition detector and then output the field voltage equivalent value; and an electric characteristic computation unit configured to calculate an output voltage target value of the electric power converter on the basis of the angular frequency, a current value detected by the current detector, the level detection signal output from the system condition detector, and the field voltage equivalent value, wherein the field voltage computation unit comprises a switching circuit configured to switch a constant used for calculation on the basis of the level detection signal, and the output voltage of the electric power converter is controlled on the basis of the output voltage target value.

20. The power supply system according to claim 19, wherein the system condition detector detects whether an output of the voltage detector is equal to or less than a predetermined value or whether a protective relay which detects a power transmission line system fault in the electric power system is activated.

* * * * *